INVENTORS
James H. Yeager
Keith S. Eckberg
BY
Roland A. Anderson
Attorney

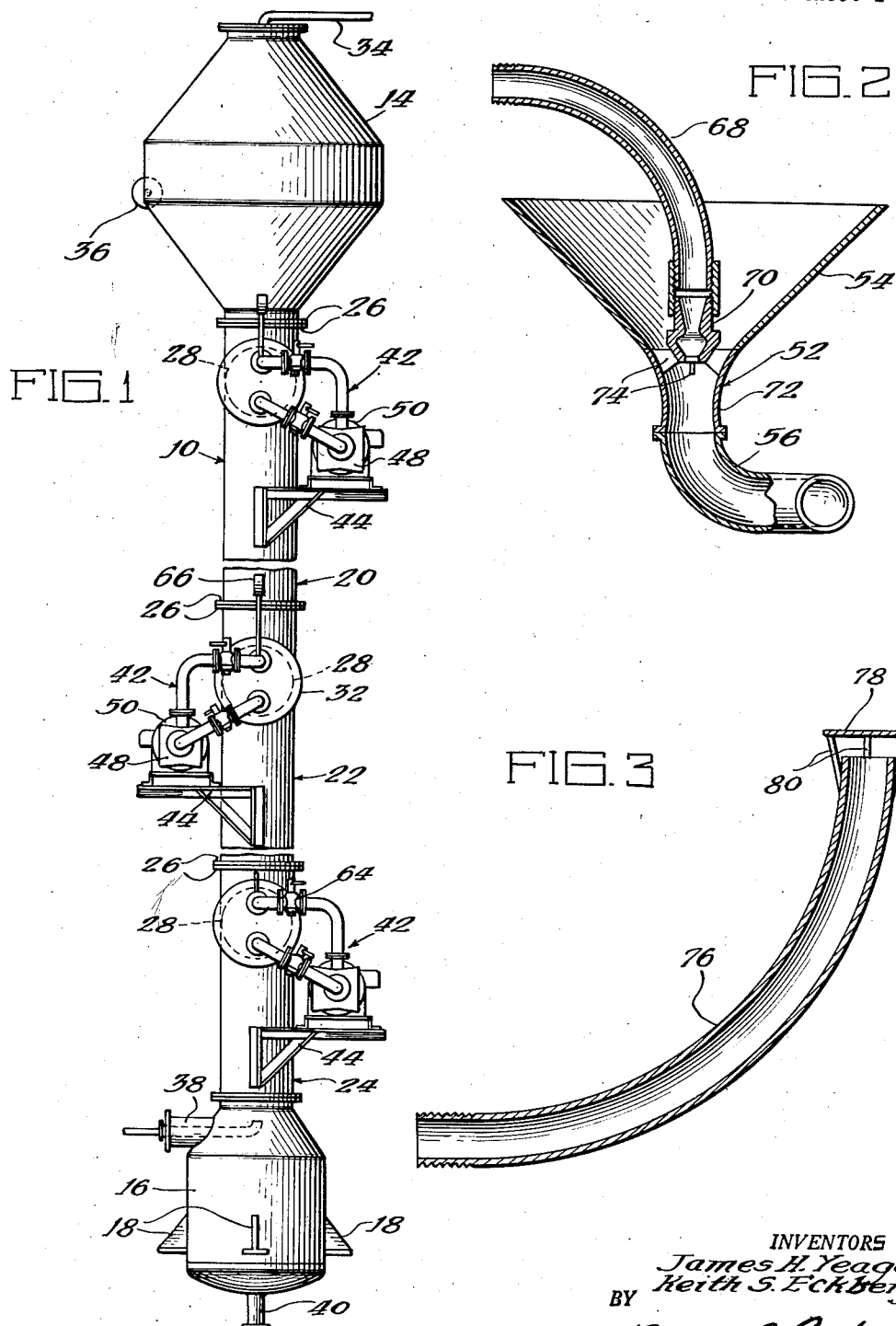

United States Patent Office 2,759,801
Patented Aug. 21, 1956

2,759,801

SOLVENT EXTRACTION APPARATUS USING JET MIXERS

James H. Yeager and Keith S. Eckberg, St. Louis, Mo., assignors to the United States of America as represented by the United States Atomic Energy Commission Application June 4, 1953, Serial No. 359,646

5 Claims. (Cl. 23—270.5)

This invention relates generally to an apparatus for liquid-liquid extraction. More particularly it pertains to the separation of liquid mixtures into their components by solvent extraction wherein the mixture is moved countercurrently with another fluid.

The extraction of uranium from uranyl nitrate solutions originating principally from high-grade pitchblende ores is not satisfactorily accomplished in a conventional packed extraction column. Rather the open type column should be used in order to achieve the proper dispersion and coalescence of the liquids with respect to each other. It has been found that in order to facilitate the dispersion necessary for the extraction of uranium from its acid solution, mechanical mixing of the solutions must be used. In the present invention, mechanical mixing is repeated at various levels in the column.

It is an object of this invention to provide novel apparatus whereby uranium may be extracted from a liquid solution by contacting it with another liquid with which it is immiscible and differs in specific gravity, with a maximum of efficiency and a minimum of waste. It is a further object to design an extraction column having better control on emulsion formation. A further object is the design of a column in which is eliminated or reduced the problem of scaling that normally accompanies the operation of uranium extraction in a packed column. An advantage of this device is that intimate mixing, separation, recirculation and remixing may be accomplished in a minimum of space.

These objects and advantages may be better understood by reference to the following description together with the drawings in which:

Fig. 1 is an elevational view of the apparatus of the present invention;

Fig. 2 is a vertical sectional view showing an arrangement of a jet nozzle and a deflector forming part of the apparatus;

Fig. 3 is a vertical sectional view of an attachment that may be substituted for the nozzle and deflector;

Figure 4:
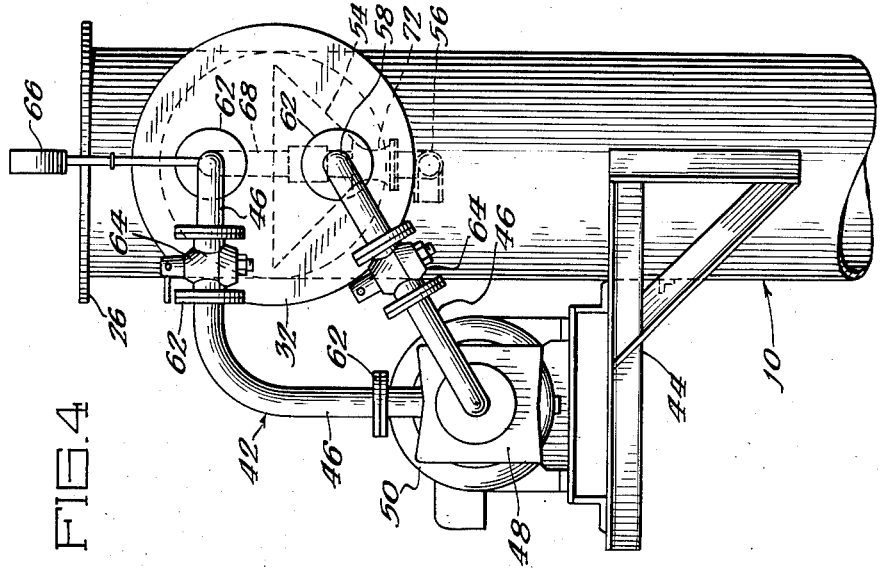
Fig. 4 is an enlarged elevational view of a portion of the apparatus shown in Fig. 1.

A column is generally indicated at 10 which is an empty cylinder enclosing a chamber 12. At the top of the column is a large decanter section 14 and at the bottom is a decanter section 16. The chamber 12 within the column makes communication at its ends with the interior of the decanter sections 14 and 16. To the decanter section 16 brackets 18 are attached by which the entire structure is supported.

Figure 5:
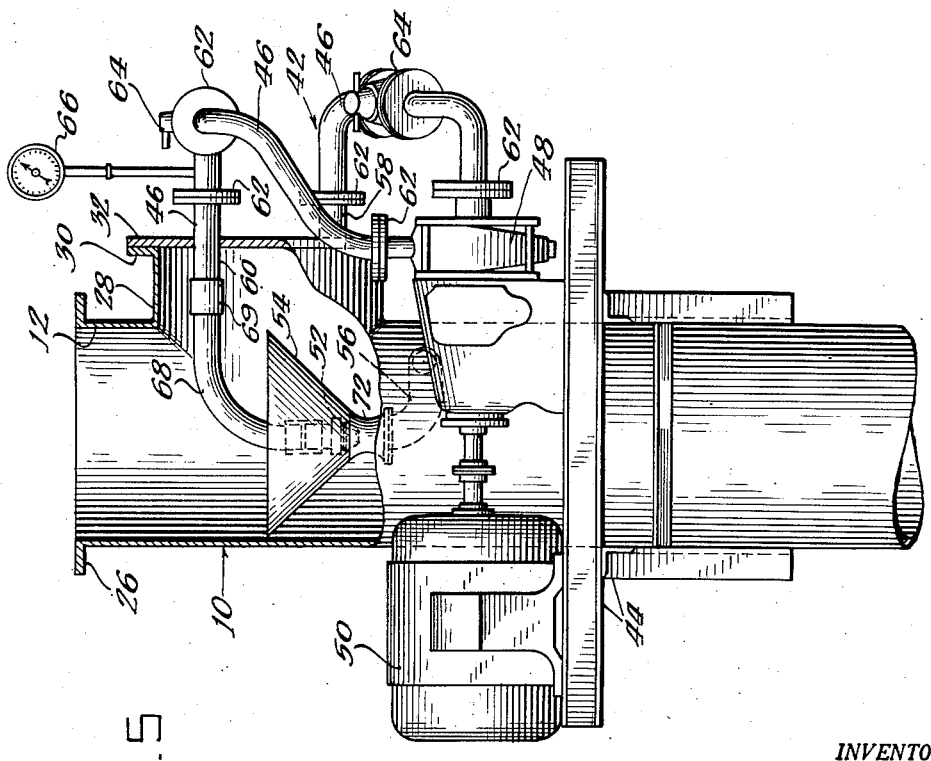
Fig. 5 is an enlarged elevational view, partly in section, of that portion of the apparatus shown in Fig. 4, taken from a different angle from that of Fig. 4.

The column 10 is divided into a plurality of sections that may be as many as are found necessary, as the two breaks in Fig. 1 indicate. However, for convenience, three sections 20, 22, and 24 are shown. The sections are attached to each other by means of flanges 26 at their ends in a fluid-tight manner and are preferably constructed of stainless steel sheet. Each of sections 20, 22, and 24 has a transverse extension 28 extending in a direction normal to the longitudinal axis of each section. Around the free end of the extension 28 a ring 30 (Fig. 5) is secured and helps to secure a cover plate 32 to the extension. Each extension 28 serves two purposes. One purpose is to provide a space together with the interior of the column in which the countercurrently moving liquids may be mixed as will be described in detail below. Another purpose is to provide access to the interior of the column after the plate 32 is removed.

The decanter sections 14 and 16 at the top and bottom, respectively, of the column 10 are empty containers which with the exception of certain inlets and outlets to be set forth hereinbelow provide a closed container with the chamber 12 within the column. At the top of the decanter section 14 is a light-fluid outlet 34 (the so-called extract outlet). Somewhat below the extract outlet is a heavy-fluid inlet 36. The lower decanter section 16 is provided with a light-fluid inlet 38 near the top thereof and with a heavy-fluid outlet 40 (the so-called raffinate outlet). It is to be noted that the end of the inlet 38 within the decanter section 16 is turned upward so as to direct the incoming light fluid into the central part of the chamber 12 within the column 10.

Each column section 20, 22, or 24 is provided with means for recirculation generally indicated at 42 which is supported by a support bracket 44 secured to the exterior of the column 10. A shown in Figs. 4 and 5, the means for recirculation 42 comprises a conduit 46, a pump 48 in the conduit driven by a motor 50, a jet 52 associated with the conduit within the column, a conical deflector 54, and a pipe 56. A liquid withdrawal end 58 of the conduit 46 extends through the plate 32 where it makes communication with the chamber 12 of the column. A liquid input end 60 of the conduit 46 also extends through the plate 32 at a point above the end 58. Between the ends 58 and 60 the conduit 46 is provided with several joints 62, two valves 64, a pressure gauge 66, and the pump 48.

Within the column 12 are disposed the remaining parts of the recirculation means 42. The end 60 of the conduit 46 is threaded in order to be connected to a conduit extension 68 by means of union 69. The extension 68 lies in a vertical plane and extends into the center of the chamber 12 where it turns downward and has its lower end on the longitudinal axis of the column. To this end a nozzle 70 of the jet 52 is attached, as shown in Fig. 2. The jet 52 also has a sleeve 72 which is connected to the nozzle 70 by radially extending angularly spaced portions 74. The sleeve 72 has a minimum inner diameter at regions between its ends, which are attached to the smaller lower end of the conical deflector 54 and the pipe 56. The conduit extension 68 supports the jet 52 which in turn supports the pipe 56 and the conical deflector 54. The axis of the conical deflector lies on that of the column 10, and the larger end of the conical deflector is uppermost and is somewhat smaller in diameter than is the vertical portion of the column. The end of the pipe 56 secured to the jet 52 is generally vertically disposed, but the greater portion of the length of the pipe 56 is generally horizontal and extends radially outward toward the inside of the column wall, terminating in a portion extending peripherally of the column wall and near the same and somewhat downwardly at an angle of 3 to 5°. One set of alternate pipes 56 extends peripherally in a clockwise direction, and the remaining set of alternate pipes extends peripherally in a counterclockwise direction. The pipes 56 terminate at their outer ends below the level of the associated transverse extensions 28.

In operation a relatively heavy liquid enters the column 10 through the inlet 36 while a relatively light liquid enters through the inlet 38. Ultimately these liquids fill the entire column 10 including the decanter sections 14 and 16. When the apparatus of this invention is used for the extraction of uranium from pitchblende, it is preferred that the heavy liquid be a slurry obtained by nitric acid treatment of pitchblende in which is dissolved certain uranium values and silicious matter suspended therein. On the other hand the preferred light liquid which enters at the inlet 38 is diethyl ether.

Inasmuch as the acid slurry is heavier than and immiscible with the diethyl ether, the natural tendency is for the slurry to gravitate to the lower decanter sections 16 and for the diethyl ether to rise to the upper decanter section 14. The immiscibility of the liquids and the difference in specific gravities are conducive to easier decantation, for which reasons the mixing properties of the liquids are reduced. To improve the degree of mixing for the ether to extract the uranium values from the slurry as they pass countercurrently through the column, the means for recirculation 42 are disposed at spaced intervals along the column 10.

As the ether rises through the column 10, it has a tendency to accumulate in the extensions 28 where it is directed by the undersurface of the conical deflector 54. On the other hand, the descending acid slurry passes into the deflector where it mixes with liquid from jet 52. Consequently the two liquids mix and separate between each recirculation stage. The mechanics of the recirculation operation is to draw off ether phase almost free of aqueous phase from one of the extensions 28 through the liquid withdrawal end 58 of the conduit 46 and pump it back into the column 10 via the jet nozzle 52, whereby the ether is dispersed into the acid slurry. As the jet discharges the ether through the apertured vertex of the deflector 54, it draws the acid slurry which accumulates within the deflector through the sleeve 72 where the two are mixed. The mixture discharges tangentially from the pipe 56 against the column wall in a nearly horizontal plane. Inasmuch as the discharge end of the pipe 56 is inclined downwardly at a 3 to 5° angle, the mixture spirals downwardly through the column for several turns at which point the mixture again confronts the next lower stage of recirculation. By this time however some of the mixture has lost its momentum, and some of the ether disassociates from the acid slurry because of their inherent immiscibility, taking with it certain of the uranium values from the acid. Because of the specific gravity difference some of the ether rises again to the extension 28, and that portion which is not withdrawn again through the conduit 46 rises from the upper end of the extension 28 and gradually ascends to the decanter section 14. In similar stages and acid slurry descends to the decanter section 16, yielding as it goes the uranium values to the ether. Obviously as the acid slurry reaches the lower stages of the column, its uranium content diminishes, but it confronts increasingly purer quantities of ether which extract the remaining uranium values.

Because the pipes 56 terminate at regions of the column 10 below the associated extensions 28, the turbulence produced by the pipes 56 does not affect the extensions 28, and the liquid gathered therein is relatively calm and pure in the relatively light fluid.

A salient feature of this invention is the relative levels at which several of the parts are disposed along the column 10. The end 58 of the conduit 46 is disposed on a level between the levels of the upper end of the deflector 54 and the outlet of the pipe 56. Because of this construction the ascending ether tends to accumulate between these latter levels and within the extension 28. Consequently the recirculated phase its ether-rich in character.

At the top of the upper decanter section 14 the uranium-rich ether (extract) is withdrawn from the column 10 through the outlet 34. At the bottom of the lower decanter section 16 the acid slurry (raffinate) is withdrawn via the outlet 40.

An alternative mixing unit for that shown in Fig. 2 is shown in Fig. 3 and comprises a curved pipe 76, a baffle 78 positioned in spaced relation to one end of the pipe 76, and a plurality of spaced rod-like elements 80 securing the baffle 78 to said one end of the pipe. The other end of the pipe 76 is secured to the input end 60 of the conduit 46, and the pipe and the baffle 78 lie on the vertical axis of the column 10. The pipe 76 may extend upward as shown in Fig. 3 or may extend downward. In any event the baffle 78 and the associated end of the pipe 76 should not be at the same vertical level as any of the transverse extensions 28.

In operation, the relatively pure light liquid (ether) that the pump 48 draws from the extension 28 and forces through the conduit 46 and the pipe 76 is directed radially outward from the end of the pipe 76 by the baffle 78 and mixes with the heavy fluid as it moves downward through the column 10. The mixing of the two fluids facilitates an interchange of material between the fluids before they separate from one another because of their immiscibility and difference in specific gravity. This operation is repeated at the various sections of the column. Since each baffle 78 is not at the same level as any of the extensions 28 of the column 10, the fluid mixture coming from the pipe 76 does not tend to accumulate in the extension 28, but relatively pure light fluid goes there.

The teachings of this invention should not be deemed to be limited to the embodiment illustrated in the drawings and described above. Many equivalent devices employing the teachings will readily be devised by persons skilled in the art. Accordingly, the present invention should be deemed to be limited only by the appended claims.

What is claimed is:

1. An assembly for the countercurrent treatment of fluid having different specific gravities comprising a column having a heavy-fluid inlet and a light-fluid outlet near the top thereof, the column also having a heavy-fluid outlet and a light-fluid inlet near the bottom thereof, and a plurality of means spaced vertically of the column for recirculating the liquids, each means including a conical deflector centrally disposed within the column with its vertex lowermost and an aperture in its vertex, a jet in the deflector directed downwardly toward the aperture, and a pipe attached to the vertex of the deflector and having an outlet adjacent the inner side of the column wall.

2. The assembly specified in claim 1, each of said spaced means further including a pump having an intake conduit connected to the interior of the column at a point above the outlet of the pipe and an exhaust conduit passing through the column wall above the upper end of the deflector and connected to the jet.

3. The assembly specified in claim 2, the pump intake conduit being connected to the column wall below the upper end of the conical deflector.

4. An assembly for the countercurrent treatment of fluids having different specific gravities comprising a column having at the top a light-fluid outlet and a heavy-fluid inlet below said outlet and at the bottom a light-fluid inlet and a heavy-fluid outlet below said inlet, the column also having a plurality of transverse extensions spaced lengthwise of the column, and a plurality of recirculating means associated with the various transverse extensions, each means comprising a conical deflector centrally disposed within the chamber and having an aperture in its vertex which is lowermost, and a jet in the deflector directed downwardly toward the aperture, a pipe attached to the vertex and having an outlet tangentially adjacent the interior of the column wall below the aperture, a pump mounted adjacent and exterior to the transverse extensions and having intake and exhaust conduits, the intake conduit being connected to the interior of the extension at a point above the outlet of the pipe and below the uppermost part of the deflector, and the exhaust conduit passing through the cylinder wall above the associated deflector and connected to the jet.

5. An assembly for the countercurrent treatment of fluids having different specific gravities comprising a column having a heavy-fluid inlet and a light-fluid outlet near the top thereof, the column also having a heavy-fluid outlet and a light-fluid inlet near the bottom thereof, and a plurality of means spaced vertically of the column for recirculating the fluids, each of said means including a conical deflector centrally disposed within the column with its vertex lowermost and an aperture in its vertex, said conical deflector being spaced from the walls of the column, a jet directed downwardly into the aperture, and means exterior to the column whereby fluid may be withdrawn from the column below the deflector and recirculated by pumping the fluid back into the column above the deflector and downward through the jet.

References Cited in the file of this patent

UNITED STATES PATENTS

| | | |
|---|---|---|
| 1,160,848 | Conklin | Nov. 16, 1915 |
| 2,009,347 | Sheldon | July 23, 1935 |
| 2,290,980 | MacLean | July 28, 1942 |